C. A. PETERSON.
WAGON POLE.
APPLICATION FILED OCT. 31, 1913.
1,197,949.
Patented Sept. 12, 1916.
2 SHEETS—SHEET 1.
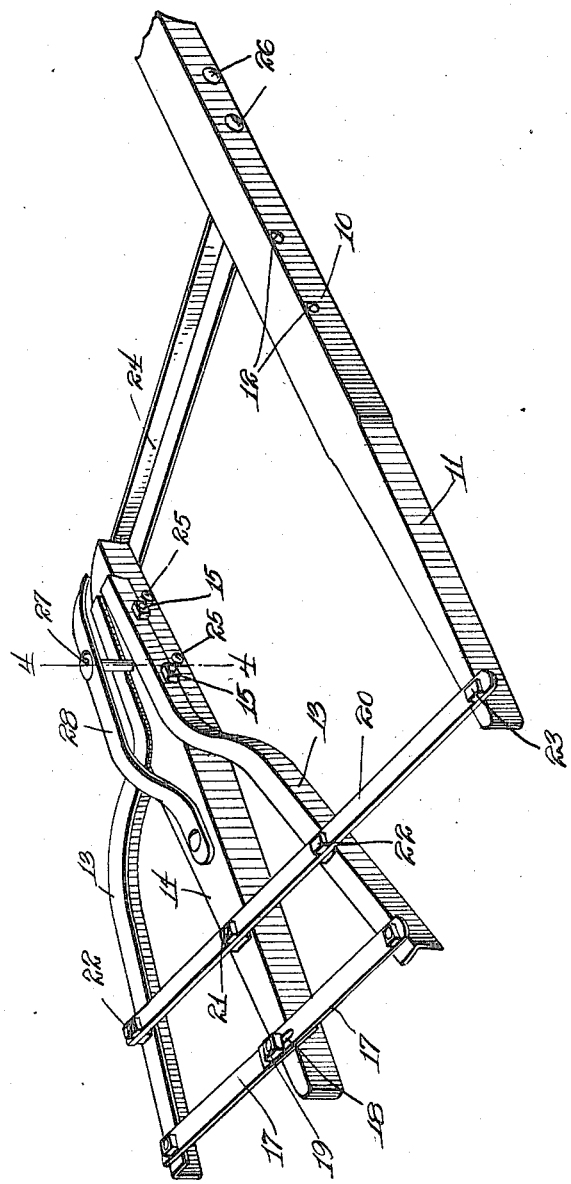
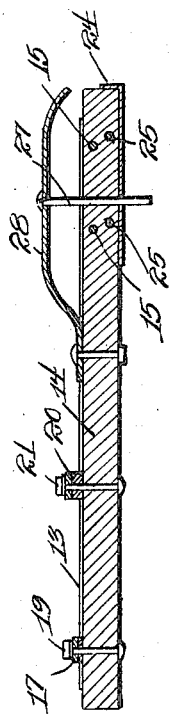
Witnesses
Wm. H. Mulligan
Ross J. Woodward
Inventor
Charles A. Peterson,
By Richard Dewey,
his Attorney C. A. PETERSON.
WAGON POLE.
APPLICATION FILED OCT. 31, 1913.
1,197,949.
Patented Sept. 12, 1916.
2 SHEETS—SHEET 2.
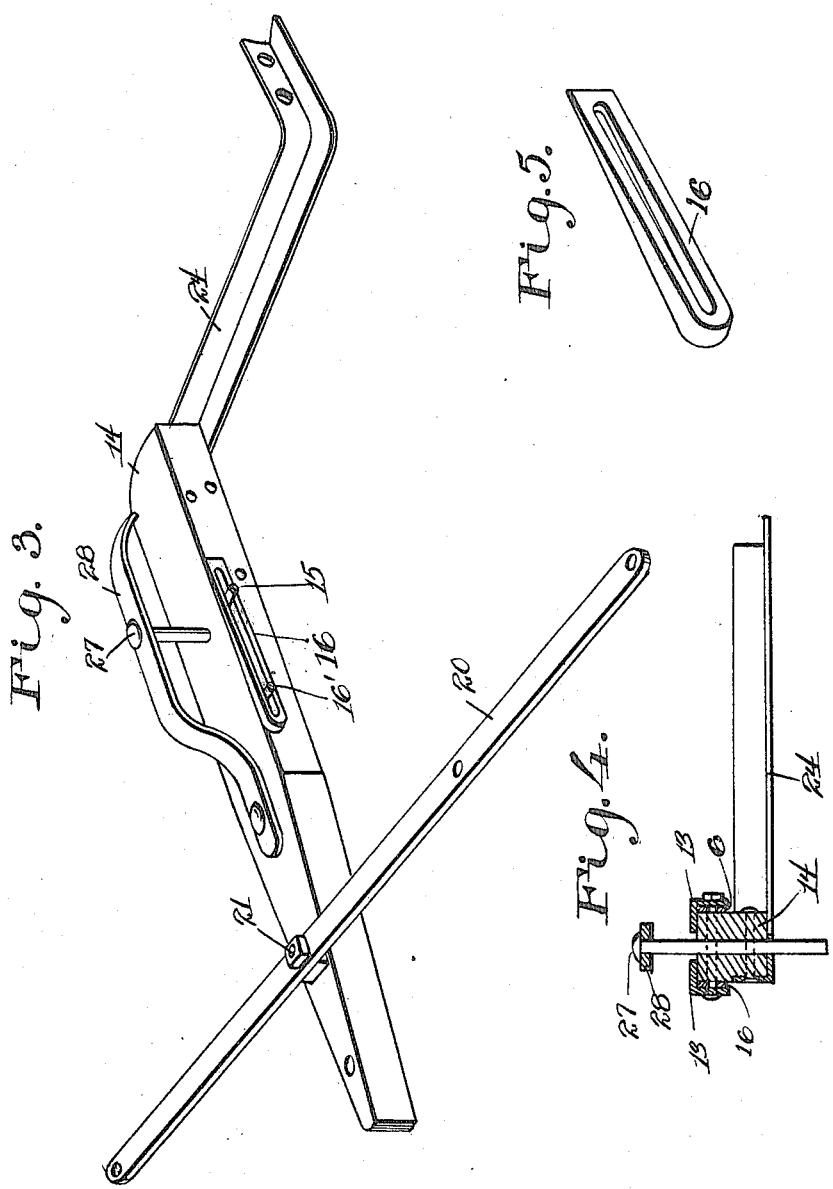

UNITED STATES PATENT OFFICE.

CHARLES A. PETERSON, OF GARFIELD, KANSAS.

WAGON-POLE.

1,197,949. Specification of Letters Patent. Patented Sept. 12, 1916.

Application filed October 31, 1913. Serial No. 798,549.

*To all whom it may concern:*

Be it known that I, CHARLES A. PETERSON, a citizen of the United States, residing at Garfield, in the county of Pawnee and State of Kansas, have invented certain new and useful Improvements in Wagon-Poles, of which the following is a specification.

This invention relates to an improved vehicle pole-attaching device, and the principal object of the invention is to provide a device by means of which the pole of a two-horse vehicle can be so mounted that three horses may be used. This would be very convenient when used in connection with vehicles of the load-hauling type, since the attachment could be easily carried about and when it was desired to haul a load requiring three horses instead of two, the pole could be so mounted that the three horses could be used.

Another object of the invention is to so construct the attaching means that it may be very quickly put in place and yet be so mounted that when in place the pole will be very strongly mounted.

Another object of the invention is to provide an improved means for mounting the bracing arms for the pole.

This invention is illustrated in the accompanying drawings wherein—

Figure 1 is a perspective view showing the pole supported by the improved connecting means; Fig. 2 is a longitudinal sectional view through the auxiliary pole forming part of this invention; Fig. 3 is a perspective view of the attaching means removed from the main pole; Fig. 4 is a section taken along the line 4—4 of Fig. 1; Fig. 5 is a perspective view of one of the wedges used in connection with this invention.

In the accompanying drawings the numeral 10 indicates the main pole of the vehicle. This pole is provided with the tapered inner end portion 11 and is provided near this tapered end portion with openings 12 so that the side arms 13 may be removably connected with the pole by means of bolts. When this pole is used in connection with two horses, it has its tapered inner end portion connected with the vehicle in the usual manner and extends between bracing arms 13 where it is held in place by bolts.

When it is desired to use three horses, the main pole is removably positioned to one side of the bracing arms, as shown in Fig. 1. The auxiliary pole 14 is then placed between the bracing arms and is connected with the forward ends of the bracing arms by means of bolts 15 which pass through openings formed in the arms. Wedges 16 are slidably mounted as shown in Fig. 3 and are limited in their longitudinal movement toward the outer end of the auxiliary pole by means of one of the bolts 15. The rear end portions of the arms 13 are adjustably connected with the inner end of the auxiliary pole by means of straps 17 which are pivoted upon the rear end portion of the arms 13 and provided with slots 18 in their overlapping end portions so that they may be slidably mounted upon the bolt 19. The wedge blocks 16 are intended to be used for filling the space between the bracing arms and auxiliary pole and thus cause the forward ends of the bracing arms to be tightly secured to the auxiliary pole.

A cross bar 20 is secured to the auxiliary pole and bracing bars by means of the bolts 21 and 22 and with the inner end of the main pole by means of the bolt 23. A connecting strip 24 which is formed from angle iron has its inner end bent to extend along the bottom and side of the auxiliary pole 14 and is secured to this auxiliary pole by means of the bolts 25. The outer end portion of the connecting strip 24 is bent to extend along the bottom and side of the main pole where it is secured by the bolts 26. A pin 27 is carried by the strap 28 and extends through the pole 14 so that a whiffle tree of the three-horse type may be pivotally connected with the auxiliary pole.

From the above description it will be apparent that when the three horses are to be used, the main pole will be removed from between the bracing arms 13 and the auxiliary pole put in place and connected with the bracing arms by means of the bolts 15, straps 17 and cross bar 20. The main pole is then connected with the cross bar 20 and connecting strip 24 by means of the bolts 23, and 26, and will then be rigidly supported in the proper position for use with three horses. It will thus be seen that the same pole can be used for either two or three horses and that this pole can be readily adjusted from one place to another by means of the improved device.

What is claimed is:

1. In a device of the character described a main pole, an auxiliary pole, bracing arms positioned upon opposite sides of said auxiliary pole, straps adjustably connecting the inner ends of said bracing arms with the inner-end portion of said auxiliary pole, a cross bar secured to said auxiliary pole and bracing arms and extending beyond one of said arms, and connected with the inner-end portion of said main pole and a rigid connecting means having one end portion secured to said auxiliary pole and its outer end portion removably secured to said main pole.

2. A device of the character described comprising an auxiliary pole, bracing arms removably connected with the forward and rear end portions of said auxiliary pole, a connecting strip formed of angle iron having one end portion extending along the bottom and one side of said auxiliary pole and secured to said auxiliary pole, the opposite end portion extending along the bottom and one side of said main pole and removably secured thereto, and a cross bar connecting the inner end portion of said main pole with said bracing arms and auxiliary pole.

3. A device of the character described comprising a main pole, an auxiliary pole, bracing arms rigidly secured to the forward end portion of said auxiliary pole and adjustably connected with the rear end portion, a rigid connection between said main pole and the rear end portion of said bracing arms and auxiliary pole.

4. A device of the character described comprising a main pole, bracing bars, and means whereby said main pole may be supported to one side of said bracing arms after being removed from between the same, said means comprising an auxiliary pole, means for removably securing the forward end of said auxiliary pole between the forward end portion of said arms, rigid means for connecting the rear end portion of said auxiliary pole with said arms, rigid means for removably connecting said main pole with the forward end portion of said auxiliary pole and holding the same in spaced relation, and rigid means for connecting the rear end portion of said main pole with said auxiliary pole and holding the same in spaced relation to said auxiliary pole.

5. A device of the character described comprising bracing arms, a main pole, means for removably securing said main pole between said arms, means for rigidly supporting said main pole to one side of said arms, said supporting means comprising an auxiliary pole, means for removably securing said auxiliary pole between the forward end portions of said bracing arms, rigid means for adjustably connecting the rear end portions of said bracing arms with the rear end portion of said auxiliary pole, rigid means connecting said main pole with the forward end portion of said auxiliary pole and removably secured to said main pole, and rigid means for connecting the rear end portion of said main pole with said auxiliary pole carried by said auxiliary pole and removably connected with said main pole and bracing arms.

6. A device of the character described comprising a main pole, an auxiliary pole, bracing arms positioned upon opposite sides of said auxiliary pole, securing pins carried by said auxiliary pole and passing through said arms, wedge blocks slidably connected with said auxiliary pole and positioned between said auxiliary pole and bracing arms, rigid means connecting said auxiliary pole with said main pole and with said bracing arms and rigid means adjustably connecting said auxiliary pole with said bracing arms.

In testimony whereof I affix my signature in presence of two witnesses.

CHARLES A. PETERSON.

Witnesses:
ELMER WILLIAMS,
A. T. OLSON.

Copies of this patent may be obtained for five cents each, by addressing the "Commissioner of Patents, Washington, D. C."